United States Patent
Riff

[15] 3,673,588
[45] June 27, 1972

[54] VOLTAGE REGULATOR INDICATING CIRCUIT FOR UNDERVOLTAGE, NORMAL VOLTAGE AND OVERVOLTAGE CONDITIONS

[72] Inventor: James A. Riff, Chicago, Ill.
[73] Assignee: Motorola, Inc., Franklin Park, Ill.
[22] Filed: Jan. 14, 1970
[21] Appl. No.: 2,890

[52] U.S. Cl. ..................340/248 A, 324/51, 324/133, 340/249
[51] Int. Cl. .............G01r 19/16, G01r 31/02, G08b 21/00
[58] Field of Search ...............324/51, 72.5, 133; 340/248, 340/249

[56] References Cited

UNITED STATES PATENTS

| | | | |
|---|---|---|---|
| 3,311,907 | 3/1967 | Teal | 340/248 |
| 3,321,754 | 5/1967 | Grimm et al. | 340/249 |
| 3,354,448 | 11/1967 | Brolin | 340/248 |
| 3,437,916 | 4/1969 | Mazurkevics | 340/248 UX |
| 3,457,560 | 7/1969 | McKinley | 340/248 |
| 3,505,663 | 4/1970 | Yule | 340/248 |
| 2,817,830 | 12/1957 | Raver | 340/249 |
| 3,210,727 | 10/1965 | McLaughlin et al. | 340/249 X |
| 3,217,311 | 11/1965 | Custer et al. | 340/249 |

*Primary Examiner*—Gerard R. Strecker
*Attorney*—Mueller & Aichele

[57] ABSTRACT

An indicating circuit for use in a vehicular electrical system having a DC power source and a dynamoelectric machine to supply a charging current to the DC power source. One or more indicating lamps are provided to give visual indication of the various operating conditions of the dynamoelectric machine to indicate failure of an alternator or regulator components or to indicate below normal, normal, and above normal voltage outputs therefrom. Where two or more indicating lamps are used, they are controlled by voltage differential amplifiers having gated outputs therefrom connected to a third amplifier. The third amplifier control energization of the indicating lamp which indicates the normal voltage output of the dynamoelectric machine, and energization of either of the two voltage differential amplifier circuits will render the third amplifier inoperative by a signal through the associated gate circuit.

7 Claims, 2 Drawing Figures

PATENTED JUN 27 1972 3,673,588

INVENTOR.
JAMES A. RIFF
BY Mueller, Aichele & Rauner
ATTORNEYS.

VOLTAGE REGULATOR INDICATING CIRCUIT FOR UNDERVOLTAGE, NORMAL VOLTAGE AND OVERVOLTAGE CONDITIONS

BACKGROUND OF THE INVENTION

This invention relates generally to a voltage regulator indicating circuit, and more particularly to a voltage regulating indicating circuit which can be used either permanently on a motor vehicle or can be plugged in as a tester to ascertain the operating condition of a generator or alternator, or the like.

Most present day vehicles use either a direct current generator or an alternator with associated rectifiers to apply current to the battery and the electrical accessories of the vehicle. The current applied to the battery serves to recharge the battery and maintain the charge therein at a given level. In prior electrical systems there is an indicating device, such as a lamp or meter, which has one end connected to the battery and the other end connected to the output of the voltage regulator. Any difference of potential across the indicating device will generally give an indication that the output of the alternator is zero or below the desired output level. That is, under some malfunction conditions of the generator or alternator the indicating device will warn the operator of the motor vehicle, for example, by energizing a lamp as is most often the case. When the indicating lamp is not energized the operator is led to believe that the electrical system of his vehicle is operating properly, a presumption that may lead to disastrous results. This is true because light indications, or for that matter meters as well, only indicate certain kinds of malfunctions or failures. There are some kinds of component or system failures that will open the current path through the indicating lamp or meter. Since a light "off" condition is assumed by the operator to mean "all is well" with the electrical system, he will not be aware of this type of malfunction. Also, such vehicles are not equipped to indicate a failure that would apply excessive charge to the battery, as for example, when the voltage regulator malfunctions to increase the output voltage of the generator or alternator. Additionally, vehicles generally are not equipped with light indicating means to indicate that the battery charging system of the vehicle is operating properly. Therefore, an operator of a motor vehicle may drive many miles without ever realizing that there is something wrong with the battery charging system of the vehicle.

Also, in servicing the electrical system of vehicles to calibrate or repair the battery charging system, complicated and expensive equipment is required. It requires a skilled person to evaluate the information obtained by the testing equipment to determine whether or not the battery charging system is operating properly, and if not, to determine the cause of the improper operation and repair the same.

SUMMARY OF THE INVENTION

Accordingly, it is an object of this invention to provide an indicating circuit that will energize an indicating device such as a lamp or the like upon failure in any respect of the system to supply charging current to the battery of a motor vehicle.

Another object of this invention is to provide a voltage regulator indicating circuit which indicates the above normal and normal voltage conditions within the battery charging circuit of tee vehicle in addition to the no charge condition.

Yet another object of this invention is to provide a voltage regulator indicating circuit which can be used as a test instrument to indicate the various modes of operation of a battery charging circuit thereby to indicate to an unskilled person the type of malfunction encountered, if any.

A still further object of this invention is to provide a voltage regulator indicating circuit which is efficient and reliable in operation, inexpensive to manufacture and which is small in size to be easily incorporated within the same housing as an associated voltage regulator.

Briefly, in one illustrated embodiment, the voltage regulator indicating circuit of this invention can be incorporated directly within the same housing as a transistorized voltage regulator. In this instance, the indicating circuit receives control voltage only from the output of the generator or alternator, whichever the case may be, to render a current control device non-conductive when a normal voltage output is obtained. However, when no voltage output or a below voltage output is obtained from the generator or alternator, the current control device is automatically rendered conductive by a current path from the battery through an associated indicating lamp. By this arrangement a failure of the alternator or voltage regulator which causes an open circuit will still cause energization of the indicating device.

Where the indicating circuit is used as a test instrument in accordance with another illustrated embodiment, the current control device has a control electrode thereof connected to a pair of resistors which form a common circuit point therebetween and this circuit is then used to indicate a normal voltage output of the generator or alternator. Gate signals are applied to the juncture between the resistors in response to either below normal voltage output or above normal voltage output of the generator or alternator to disable the current control device. In this instance, the indicating lamp used to indicate a normal voltage current condition will be rendered inoperative in response to either of the gate signals and one or the other indicating lamps will be energized to give an indication of an abnormal voltage condition, i.e., a below normal voltage condition or an above normal voltage condition.

DESCRIPTION OF THE PREFERRED EMBODIMENT

Figure 1:
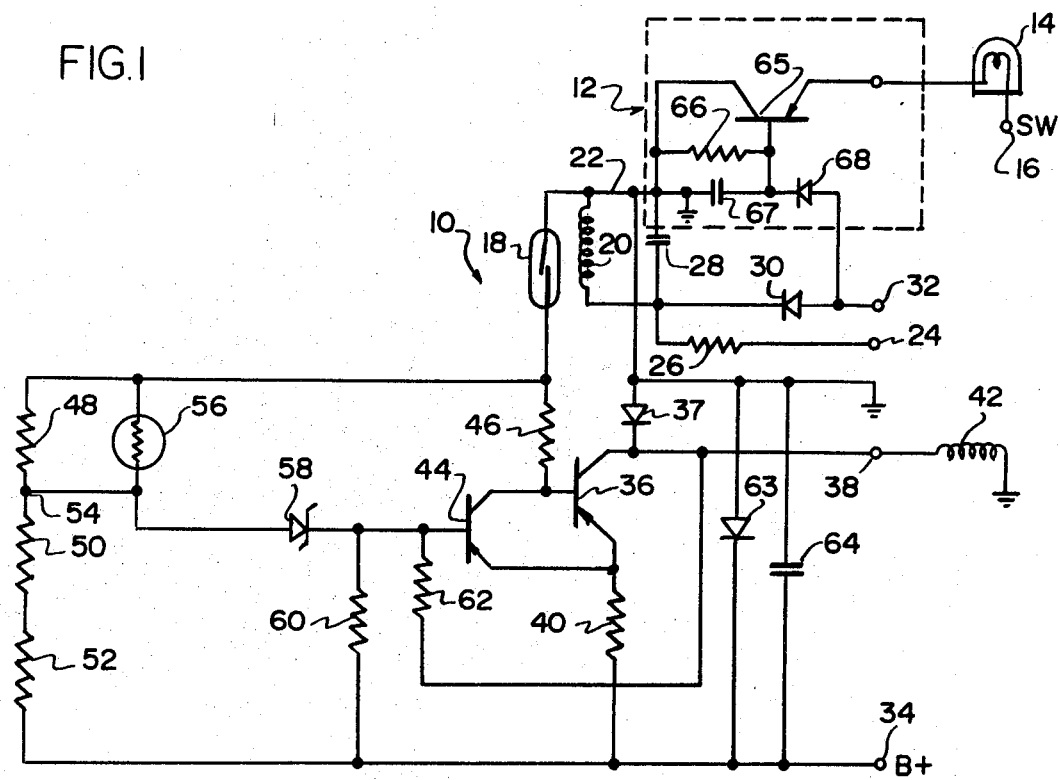
FIG. 1 is a schematic diagram illustrating a voltage regulator circuit incorporating the voltage regulator indicating circuit of this invention.

Referring now to FIG. 1 there is seen a transistorized voltage regulator circuit designated generally by reference numeral 10 which most advantageously incorporates an indicating control circuit 12 for controlling energization of a lamp 14, it being understood that any suitable indicating device may be used. The lamp 14 has one end thereof connected to a terminal 16 which, in turn, is connected preferably to the ignition switch, not shown, of an automobile to receive energizing current therefrom when the ignition switch is closed and before the engine has started running to indicate that no voltage output is provided by the alternator or generator of the vehicle.

The voltage regulator circuit 10 receives energizing current through a reed switch 18 which is actuated by an electromagnetic device 20 having one end thereof connected to ground potential via a line 22 and the other end thereof connected to a terminal 24 through a resistor 26. The terminal 24 is arranged for connection to the ignition switch of the automobile to initially cause closing of the reed switch 18 to energize the regulator circuit 10 only when the ignition switch is in the on position. A capacitor 28 is connected across the electromagnetic device 20, and an isolating diode 30 has one end thereof connected to the juncture of the electromagnetic device 20 and capacitor 28 and the other end thereof connected to a terminal 32 for receiving the output voltage from a generator or alternator, whichever the case may be, which also serves to energize the electromagnetic device 20. Also, the regulator 10 is provided with a terminal 34 arranged for connection to the battery of an automobile.

A power transistor 36, here shown as a PNP type, has its collector electrode connected to a terminal 38 and its emitter electrode connected through a resistor 40 to the positive potential applied to terminal 34. Also connected to the collector electrode of transistor 36 is a diode 37 which may serve as a protection device. When the voltage regulator circuit 10 is used to regulate the output voltage of an alternator, the terminal 38 is connected to a field winding 42 within the alternator body, not shown, in a common and well-known manner.

The base control voltage for transistor 36 is established by the emitter-collector electrode current path of a PNP control transistor 44 and a bias resistor 46. The resistor 46 and transistor 44 together with the resistor 40 form a variable value voltage divider network to control the conduction of transistor 36 in accordance with the output voltage variation applied to terminal 32 to regulate the output of an alternator by correspondingly varying the current applied to the field winding 42 thereof through terminal 38. The value of resistor 46 is relatively high and, as such, the bulk of the current through the circuit will be in the field winding 42.

A voltage divider network including a plurality of series connected resistors 48, 50 and 52 are connected between the reed switch 18 and the terminal 34 and are selected to provide a voltage value at circuit point 54 of proper potential for operation of the voltage regulator circuit 10. Preferably, a temperature responsive variable resistor 56 is connected in parallel with a resistor 48 and is selected to effectively track changing voltage requirements of a battery being charged at different temperatures. That is, the temperature responsive variable resistor 56 compensates for variation in ambient temperature to insure proper charging current to a battery.

A reference voltage device 58, preferably a zener diode, has the anode thereof connected to the circuit point 54 and the cathode thereof connected to the base electrode of the transistor 44, a resistor 60 and a resistor 62. The resistance value of the resistors 48 and 60 together with the resistance value of the temperature responsive device 56 are selected, together with the breakover voltage value of the reference voltage device 58, to cause conduction of the reference voltage device 58 at a predetermined voltage value which, in turn, controls the output current from power transistor 36 to apply energizing current to the terminal 38. This energizing current, in the case where the voltage regulator circuit 10 is used to supply energizing current to the field winding 42 which may be a pulsing current having a frequency in the order of 3,000 Hz more or less.

A filter capacitor 64 is connected between the terminal 34, which receives battery potential, and the ground potential to provide a filtered operating potential across the load electrodes of transistors 36 and 44 while pulses of DC current are supplied to the field winding 42. Also, a diode 63 is added to the circuit to serve as a transient suppressor for negative pulses.

In accordance with this invention, the indicating circuit 12 includes a current control device 65, preferably being a transistor which has its emitter electrode connected to the indicating lamp 14 and its collector electrode connected to ground potential. The base electrode of transistor 65 is connected to a parallel network comprising a resistor 66 and a capacitor 67 and a blocking diode 68. The blocking diode 68 has its anode connected to the terminal 32 to receive a potential only from the output of an alternator to control de-energization of the lamp 14 in response thereto.

In operation, the transistor 65 is rendered conductive by current flow from the battery through the indicating lamp 14, the emitter base junction of the transistor and the resistor 66. This current flow is obtained by the positive potential applied to the ignition switch of the automobile. Therefore, under the initial starting sequence condition of an engine, when the switch is turned on and the engine is not running, transistor 65 is rendered highly conductive to energize the lamp 14, which may be red or have a red lens, thereby giving an indication that no voltage output is developed by the alternator. However, once the engine has started, a voltage is applied to the capacitor 67 through the blocking diode 68 in response to the output of the alternator as sensed on the terminal 32. The charge on capacitor 67 increases to the value of the output of the alternator which, in turn, reverse biases the base emitter junction of transistor 65 to render it non-conductive and extinguish the indicating lamp 14. When the voltage value at the output of the alternator drops below a certain value the capacitor 67 will discharge somewhat through the parallel resistor 66 to reduce the voltage applied to the base electrode of transistor 65. This action will provide a slight forward bias on transistor 65 and it will conduct to a degree depending upon the amount of forward bias. Therefore, when the output of the alternator is only slightly below the required value the lamp 14 will glow slightly and when the output of the alternator is substantially below the required value the lamp 14 will glow brightly, and all conditions between these two extremes will cause a corresponding change in lamp brightness.

The indicating circuit 12 is so small and requires so few components that it can readily fit within the same housing as the voltage regulator circuit 10 to simplify the electrical wiring, as generally accomplished by wire harnesses, of a motor vehicle.

Figure 2:
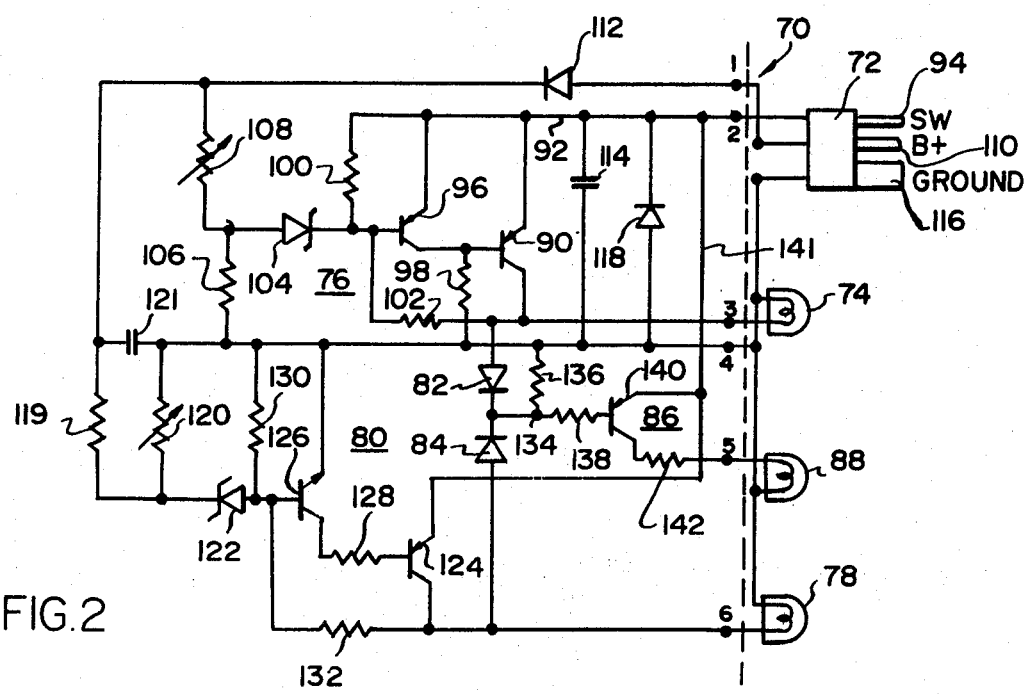
FIG. 2 is a schematic diagram illustrating a voltage regulator indicating circuit of this invention which can be used as a test circuit to indicate the various modes of operation of a generator or alternator between the below normal voltage, normal voltage, and above normal voltage conditions.

The novel advantages obtained by using the indicating circuit 12 makes possible the construction of a simple, inexpensive test circuit which can be used to analyze the various voltage conditions at the output of an alternator and which can be portable or made part of the motor vehicle. FIG. 2 illustrates one embodiment of a test circuit constructed in accordance with the principles of this invention. Here, the test circuit is designated by reference numeral 70 and is provided with a plug 72 to mate with a corresponding receptacle provided on the vehicle, not shown. The test circuit 70 is very compact and relatively inexpensive and, as such, can be made part of a permanent installation in a vehicle for continuous monitoring of the alternator output.

To accomplish this, an indicating lamp 74 is connected to a first voltage value responsive circuit 76 to be energized therefrom in response to a voltage value condition from the alternator which is below the normal voltage value. A second lamp 78 is connected to a second voltage value responsive circuit 80 to be energized therefrom in response to a voltage value condition from an alternator which is above the normal voltage value. The output signals from each of the voltage value responsive circuits 76 and 80 are coupled through gating diodes 82 and 84, respectively, to disable a transistor stage 86, which when conducting energizes an indicating lamp 88 to indicate the normal voltage value condition of the alternator.

The voltage value responsive circuits 76 and 80 are here illustrated as being substantially the same as the voltage regulator 10 shown in FIG. 1. That is, the voltage value responsive circuit 76 includes a power transistor 90 having the collector electrode thereof connected in series with the indicating lamp 74 and the emitter electrode thereof connected to a line 92 which, in turn, is connected to a plug connector 94 of the plug 72. A control transistor 96 is connected in series with a resistor 98 and the juncture therebetween is connected to the base electrode of the power transistor 90. A pair of resistors 100 and 102 are connected to the base electrode of transistor 96 and to the cathode of a reference voltage device 104, preferably a zener diode, or the like.

In this embodiment, the voltage value responsive circuit 76 is adjustable by means of a voltage divider network including a resistor 106 and a potentiometer 108 connected in series therewith, it being understood that the potentiometer 108 may be a fixed valve resistor, if desired. Therefore, the maximum voltage value of the below voltage condition will be determined by the value of potentiometer 108 which, in turn, determines the breakover voltage point of zener diode 104 to render transistor 90 non-conductive and extinguish the indicating lamp 74. The voltage divider network comprising resistor 106 and potentiometer 108 receives its operating potential from a plug connector 110 of a plug 72 through a diode 112 connected in series therewith. Also, a filter capacitor 114 is connected between the plug connector 94, which receives DC potential from the ignition switch of the vehicle and to the plug connector 116 of the plug 72 which is connected to ground potential. Connected in parallel with capacitor 114 is a diode 118 for suppressing undesirable transients.

Operating potential from plug connector 110 is also delivered to a resistor 119 and a potentiometer 120 associated with the voltage value responsive circuit 80. A filter capacitor 121 is connected between the resistor 119 and potentiometer 120. Here also, the potentiometer 120 may be a fixed value resistor if desired. The resistance value of the potentiometer 120 will determine the minimum voltage at which the abnormally high voltage value condition will be indicated by the indicating lamp 78. That is, the voltage value which will cause conduction of a zener diode 122 is adjustably selected by the potentiometer 120. A power transistor 124 is connected in series with the indicating lamp 78 and is controlled in response to a control transistor 126 connected to the base electrode thereof. However, in this instance a resistor 128 is connected in series with the transistor 126 and the base electrode of transistor 124 to limit conduction of transistor 124 within prescribed values since this circuit operates at higher voltage values and current. Also, a resistor 130 is connected to the juncture between the base electrode of transistor 126 and the anode of zener diode 122, and a resistor 132 is also connected to this juncture.

Preferably, the resistance values of the voltage value responsive circuit 76 are selected to cause the reference voltage device 104 thereof to be activated at, for example, a value of 13.2 volts, more or less, at the output of the alternator to render transistor 90 non-conductive and extinguish the low voltage value condition indicating lamp 74. On the other hand, the reference voltage device 122, which is connected in opposite conductive polarity in the circuit than that of the reference voltage device 104, will be activated upon sensing an output at the alternator in excess of 14.9 volts, more or less.

In accordance with this embodiment of the invention the gating diodes 82 and 84 have their cathodes connected to a common circuit point 134 located between a pair of series connected resistors 136 and 138 connected in the base circuit of a transistor 140 of the energizing circuit 86. The emitter electrode of the transistor 140 receives a positive potential from the plug connector 94 via a line 141 and the collector electrode of transistor 140 is connected to ground potential through a current limiting resistor 142 and the indicating lamp 88.

With a normal voltage value output at the alternator, both voltage value responsive circuits 76 and 80 are inoperative and, as such, no gating signal is applied through either of the gating diodes 82 or 84. This action will cause normal forward bias potential to be applied to transistor 140 to render it conductive and energize the indicating lamp 88 which, in turn, will indicate that a normal voltage value condition exists at the output of the alternator. However, should either of the circuits 76 or 80 become energized in response to their corresponding abnormal voltage value condition at the output of the alternator, a gating signal will be applied through the corresponding diode 82 or 84 to apply a positive potential to a base of transistor 140 thereby rendering it non-conductive to extinguish the indicating lamp 88. The plug connectors 94 and 110 may be jumpered together by internal or external circuit means when the circuit 70 of FIG. 2 is used as a portable tester.

If desired, the indicating lamps 74 and 78 may be red while the indicating lamp 88 may be green. However, it will be understood that any suitable combination of colors or indicia can be displayed by the lamps 74, 78 and 88. Accordingly, the regulator indicating circuit of this invention provides a novel means for readily obtaining information as to the several conditions of operation of a charging circuit in a vehicle, for giving visual indication of the several possible conditions of a voltage regulator circuit and for use as a test instrument which is easily portable.

I claim:

1. A voltage regulator indicating circuit for use in a vehicular system which has a DC power source and a dynamoelectric machine for supplying charging current to the DC power source, comprising in combination: first and second indicators, voltage value responsive circuit means having first and second inputs, said first input being coupled to the DC power source and said second input to the output of said dynamoelectric machine, said voltage value responsive circuit means comparing said inputs and being coupled to said first indicator to energize the same with said first and second inputs being substantially unequal, a switching circuit coupled in circuit with the DC power supply, said voltage value responsive circuit means and said second indicator, said switching circuit energizing said second indicator with said voltages of said first and second inputs of said voltage value circuit means being substantially equal, and said switching circuit further being disabled with said first and second inputs of said voltage value responsive circuit means being substantially unequal.

2. The voltage regulator indicating circuit according to claim 1 including said voltage value responsive circuit energizing said first indicator over a first predetermined range of voltage differences between said first and second input voltages, a third indicator, second voltage value responsive circuit means having a first and second input and an output, said first input being coupled to the DC power source and second input being coupled to said dynamoelectric machine, said second voltage value responsive circuit comparing said first and second inputs thereof and being coupled to said third indicator to energize the same in response to said inputs being substantially unequal over a second predetermined range of voltage differences, said first and second voltage ranges being different, said second voltage value responsive circuit further being coupled to said switching circuit to disable the same over said second range of voltage differences.

3. A voltage regulator indicating circuit to be connected to a battery charging circuit within an electrical system of a motor vehicle to indicate the operating conditions of the dynamoelectric machine used to charge the battery, comprising:

a first voltage differential amplifier circuit having a first current control device which has a pair of load electrodes and a control electrode;

a first indicating lamp connected in circuit with the load electrodes of said first current control device to be energized in response to conduction thereof;

a first reference voltage means coupled to said control electrode of said first current control device, said first reference voltage means arranged for connection to the battery charging circuit within the electrical system of the motor vehicle, said first reference voltage means being rendered operative in response to a first abnormal voltage output condition of the dynamoelectric machine within the electrical system of the motor vehicle, a second voltage differential amplifier circuit having a second current control device which has a pair of load electrodes and a control electrode;

a second indicating lamp connected in circuit with the load electrodes of said second current control device to be energized in response to the conduction thereof;

a second reference voltage means coupled to said control electrode of said second current control device, said second reference voltage means arranged for connection to the battery charging circuit within the electrical system of the motor vehicle, said second reference voltage means being rendered operative in response to a second abnormal voltage condition at the output of the dynamoelectric machine within the electrical system of the motor vehicle;

a switching circuit including a third current control device having load electrodes and a control electrode, a third indicating lamp connected in circuit with the load electrodes of said third current control device to be energized in response to the conduction thereof to indicate a normal voltage condition of the electrical system;

resistance means connected to the control electrode of said third current control device to provide an operating bias by forming a control electrode to load electrode current path from the battery to ground which, in turn, renders said third current control device highly conductive to energize said third indicating lamp; and gate means coupled between the output of each of said first and second current control devices to the control electrode of said third current control device to disable said third current control device upon conduction of either said first or second current control device.

4. The voltage regulator indicating circuit of claim 3 wherein said first reference voltage circuit means is responsive to a below normal voltage output of the dynamo-electric machine to energize said first indicating lamp in response thereto;

said second reference voltage circuit means is responsive to an above normal voltage output of the dynamoelectric machine to energize said second indicating lamp in response thereto;

and said third indicating lamp is energized by said switching circuit in response to a normal voltage output of the dynamoelectric machine.

5. The voltage regulator indicating circuit of claim 3 including fourth and fifth current control devices, each of said first and second current control devices being coupled to said fourth and fifth current control devices respectively, a direct current coupled to the control electrode of each of said fourth and fifth current control devices, and said first and second reference voltage means being coupled to the control electrode of said fourth and fifth current control devices respectively, which are connected in circuit with said first and second current control devices.

6. The voltage regulator indicating circuit of claim 5 wherein said first reference voltage means includes a zener diode connected in circuit in one polarity direction and said second reference voltage means includes a zener diode connected in circuit in the opposite polarity direction.

7. The voltage regulator indicating circuit of claim 3 wherein said gate means includes a first diode direct current coupled between the output of said first current control device and the control electrode of said third current control device, and a second diode direct current coupled between the output of said second current controlled device and the control electrode of said third current control device.

* * * * *